United States Patent [11] 3,544,711

[72] Inventor Dominick John DeBitetto
 Briarcliff Manor, New York
[21] Appl. No. 501,193
[22] Filed Oct. 22, 1965
[45] Patented Dec. 1, 1970
[73] Assignee U.S. Philips Corporation
 New York, New York
 a corporation of Delaware. by mesne assignment

[54] THREE-DIMENSIONAL DISPLAY SYSTEM EMPLOYING OPTICAL WAVEFRONT RECONSTRUCTION
 13 Claims, 18 Drawing Figs.
[52] U.S. Cl. ............................................. 178/6.5,
 178/5.2, 178/5.4, 178/7.3; 350/3.5, 350/160
[51] Int. Cl. ........................................................ H04n 9/00,
 H04n 9/02, H04n 9/54
[50] Field of Search............................................ 88/1(HOL);
 331/94.5; 332/7.5, 7.51; 330/4.3;
 96/27(H); 178/6.5, 7.2, 7.6, 7.87, 7.5(D), 7.3(D);
 350/160, 160(P), 161, 3.5

[56] References Cited
 UNITED STATES PATENTS

| | | | |
|---|---|---|---|
| 3,218,390 | 11/1965 | Bramley | 178/7.85 |
| 3,345,459 | 10/1967 | Dudley | 178/7.85 |
| 3,181,170 | 4/1965 | Akin | 178/7.5(D) |
| 2,831,055 | 4/1958 | Mattke | 178/7.6 |
| 3,253,497 | 5/1966 | Dreyer | 350/160 |
| 3,296,594 | 1/1967 | Van Heerden | 350/3.5 |
| 3,331,920 | 7/1967 | Larson | 350/160 |
| 3,395,961 | 8/1968 | Ready | 350/160 |
| 3,400,214 | 9/1968 | Hamann | 178/7.87 |

OTHER REFERENCES

Leith, Upatnieks, Hildebrand Haines, - Requirements for a Wavefront Reconstruction Television Facsimile System - Journal of the Society of Motion Picture and Television Engineers Vol. 74 - Number 10 - Oct. 1965 - Pgs. 893—896.

Leith, Upatnieks, Photography, by Laser Scientific American Vol. 212 - Number 6 - June 1965 - Pg. (24,25,27—35)

*Primary Examiner*—Robert L. Griffin
*Assistant Examiner*—Joseph A. Orsino, Jr.
*Attorney*—Frank R. Trifari

ABSTRACT: A receiver for information signals representing holograms, utilizing either a cathode ray tube or a sheet of semiconductor material capable of being reflectance modulated in accordance with the incoming signal. The radiation from a coherent light source is projected through said tube or semiconductor to recreate the originally viewed scene in three dimensions.

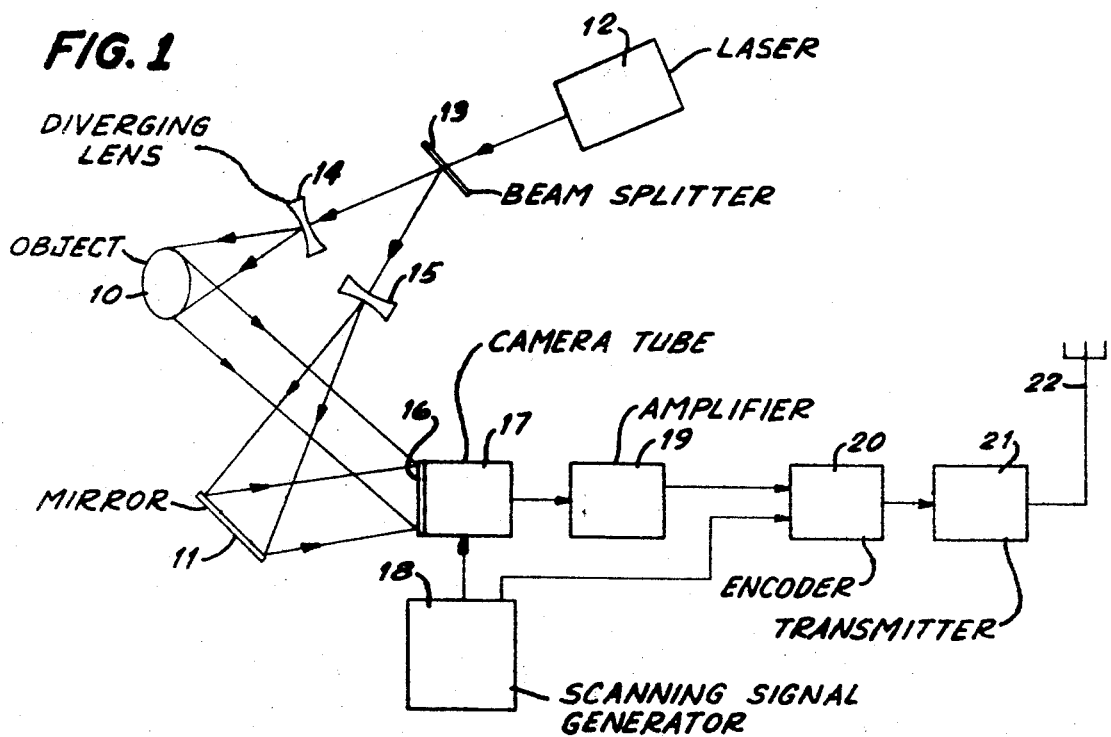
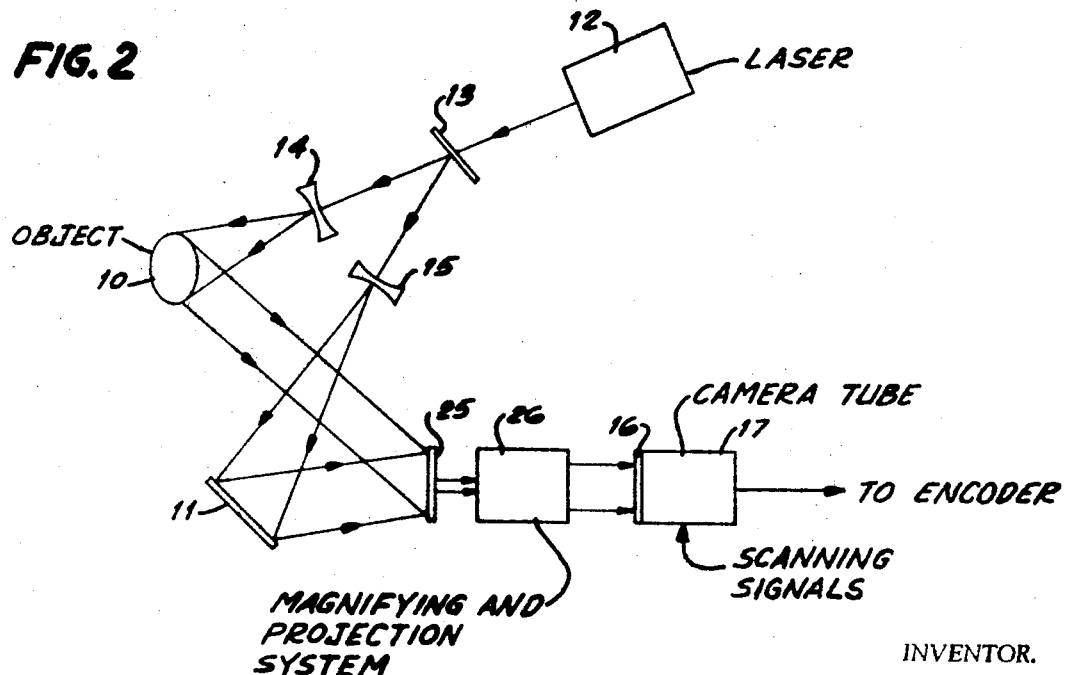

INVENTOR.
DOMINICK J. DE BITETTO
BY
AGENT

INVENTOR.
DOMINICK J. DE BITETTO
BY
Frank R. Trifari
AGENT

THREE-DIMENSIONAL DISPLAY SYSTEM EMPLOYING OPTICAL WAVEFRONT RECONSTRUCTION

This invention relates to three-dimensional display systems, and more particularly to three-dimensional television systems which employ optical wavefront reconstruction techniques.

When an object is illuminated with radiation from a conventional light source, the light is reflected from the object with a complex wavefront which may be visualized as the combination of light energy reflected in all directions from each point on the object. If an image recording device, such as a photographic plate or a television camera tube, is placed in a plane in the path of the reflected wavefront, an image of the object will be produced on the recording device only if a focusing device, such as a lens, is provided between the object and the plane. In conventional image reproduction techniques, the resultant image recorded by the recording device is a two-dimensional image.

In optical wavefront reconstruction techniques, a source of monochromatic spatially coherent light is employed to illuminate the object, and the recording device receives light reflected from the object without necessitating the interposition of a focusing device. In addition, a second or reference beam of light from the same source is directed to the recording device without being reflected from the object. The resultant "image" on the recording device will be an irregular interference pattern resulting from constructive and destructive interference of the reference light wave and the light wave reflected from the object. The light received at each point on the recording device is derived from each point on the image visible therefrom, and consequently the interference pattern received by the recording device is a record of the intensity of reflected light received from each portion of the object as well as the phase of the light energy received from each portion of the object with respect to the phase of the reference light energy. As distinguished from the conventional image reproducing techniques, each region of the interference pattern contains intensity and phase information relating to the reflectivity characteristics of each point of the object and object-to-recording device geometry, while for the conventional image each point of the reproducing device records only information relating to the reflectivity characteristics of a single point of the object.

When the reproducing device is a photographic plate, the recorded image, in optical wavefront reconstruction techniques, is called a "hologram". The image of the object cannot be seen on a hologram when viewed with ordinary light. If, however, the hologram is illuminated with monochromatic spatially coherent light, a pair of first order waves diffracted from the hologram results in the production of a real image and virtual image at opposite but symmetrical viewing angles with respect to the zero order wave. This type of optical wavefront reconstruction is described by D. Gabor in Nature 161,777 (1948), and Proc. Roy. Soc. (London) A197, 454 (1949). Images produced by this technique possess all the three-dimensional characteristics of the original object. For example, there is parallax between portions of the image corresponding to portions of the reproduced scene which are at different distances, and if the scene includes a number of objects, the more distant objects may be obscured by closer objects when the image is viewed from some directions and visible when the image is viewed from other directions.

An object of the present invention is to provide means for adapting optical wavefront reconstruction techniques to television systems.

A further object of the invention is to provide a three-dimensional television system employing optical wavefront reconstruction techniques.

A still further object of the invention is to provide an image reproducing device operable in response to the reception of holographic signals, for producing a visible three-dimensional image.

While the specification concludes with claims particularly pointing out and distinctly claiming the subject matter which I regard as my invention, it is believed that the invention will be better understood from the following description taken in connection with the accompanying drawings, in which:

FIG. 1 is a schematic illustration of a basic system for producing holographic television signals suitable for use in the system of my invention;

FIG. 2 is a schematic illustration of a portion of the system of FIG. 1 showing a modification in the optical system for use with low resolution camera devices;

Figure 3:
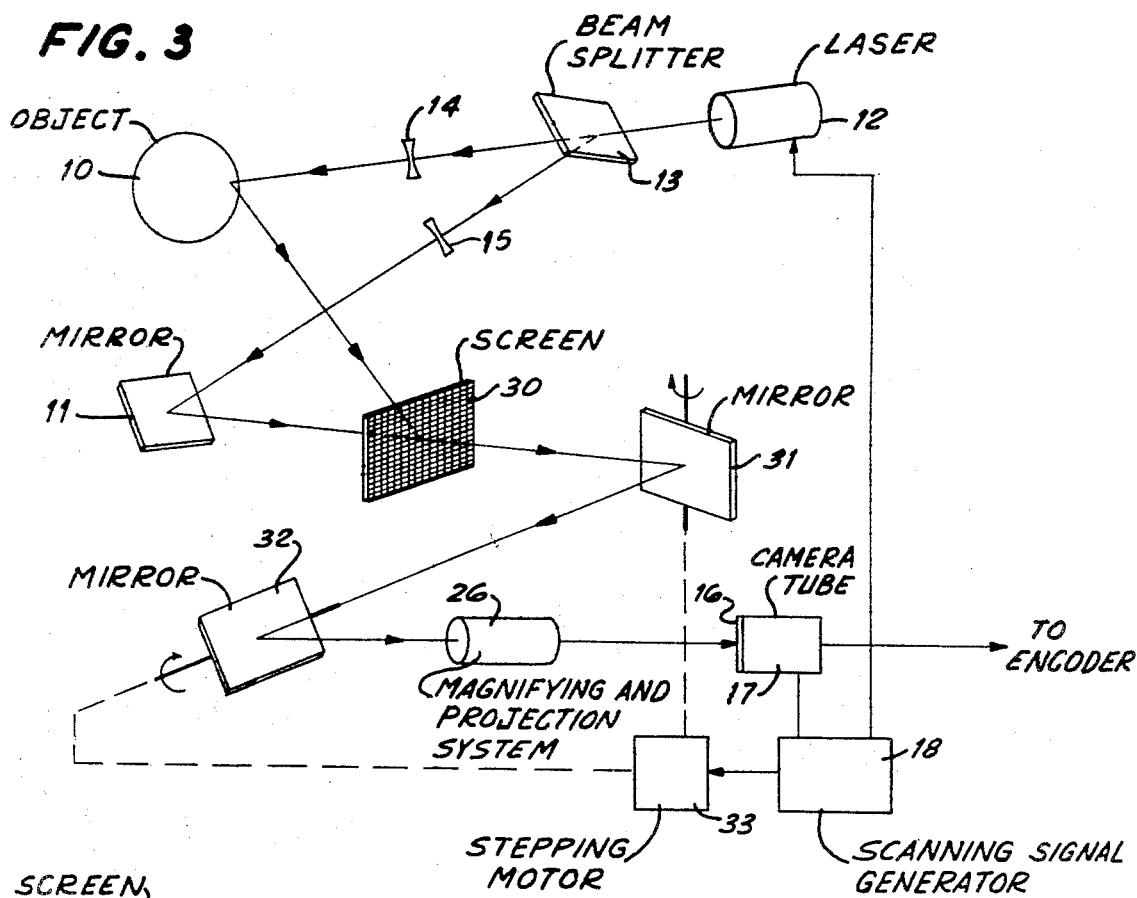
FIG. 3 is a schematic partially perspective illustration of a further modification of a portion of the system of FIG. 1.

The holographic signals, i.e., signals corresponding to a holographic image, may be derived either directly from a scene to be televised, or they may be derived indirectly by means of previously processed hologram transparencies or nontransparent hologram prints. In the basic system for obtaining the signals from light received directly from an object or scene 10, referring to FIG. 1, monochromatic spatially coherent light is directed on the object 10 and on a mirror 11. Sufficiently broad beams of light for this purpose may be obtained from a laser 12 by means of a beam splitter, such as a partly silvered mirror 13 positioned in the path of the laser beam to form two beams. A light diverging lens 14 is placed in the path of one beam of light from the mirror 13 in order to illuminate the entire object, and a light diverging lens 15 is placed in the path of the other beam from the mirror 13 in order to illuminate the mirror 11. Collimation of the beam from the lenses 14 and 15 is not necessary, since it is not necessary in optical wavefront reconstruction techniques that the wavefront of the light be plane. Light is reflected from the object 10 to the screen 16 of a television camera tube 17, such as a Vidicon. The reference beam, formed by light reflected from the mirror 11, also illuminates the screen 16. The reference beam of light and the light reflected from the object form an interference pattern on the fluorescent screen, as previously discussed.

This interference pattern is scanned by the television camera tube, by means of signals from a scanning signal generator 18, in the conventional manner, in order to provide a video signal output. The video signals are amplified in amplifier 19, and are encoded with scanning synchronization signals in the encoder 20. The encoded signals are then transmitted by means of transmitter 21 and antenna 22. It will be obvious, of course, that the transmission of the holographic signals may be achieved by other means, such as by means of modulated laser beams, without departing from the scope of my invention. By this means, extremely wideband signals (e.g., several gigacycles) may be transmitted. The transmission may also be achieved by means of optical fibers with high-picture resolution. As in the case of production of a hologram, the depth of the scene to be televised cannot be greater than the coherence length of the light source 10, and due to the restriction on motion of the object, in order to televise moving objects and the light source must be of the pulse type.

It must be recognized, of course, that the fineness of the interference pattern formed on the screen of the camera tube presents difficulties in the production of the video signals. For example, the resolution of the camera tube may be insufficient to provide signals corresponding to the interference pattern, and if signals are derived at scan rates similar to those used in conventional broadcasting television systems, the signal bandwidth may be too great for amplifying, transmitting and receiving by conventional techniques. The requirement of large bandwidth can be modified to some extent, with some loss in detail and three-dimensional effects in the resultant image, by various techniques. For example, the scan rate of the camera tube may be reduced in order to minimize the bandwidth of the signal, with a sacrifice in the ability of the system to reproduce rapid motion. Further, the signals may be derived only from a small magnified portion of the pattern. This is permissible since each portion of the pattern is representative of features of the entire object.

Thus, as shown in FIG. 2, the interference pattern is formed on a screen 25 instead of on the screen of the camera tube. An optical magnifying and projection system 26 is employed to magnify either the entire image or only a portion of the image on screen 25 and project the magnified image on the screen 16 of the camera tube. The screen 25 should be a very fine grain diffuse scattering screen in order that the interference pattern can be formed on the screen. As an example, I have found that successful holograms can be produced on a medium having a resolution of about 100 lines per millimeter. Camera tubes, such as vidicons, however, have a useful resolution of about 750 lines per inch. In this case the camera tube will be able to resolve the image if the magnifying system 26 has a magnification factor of about four. The magnifying system 26 may comprise a conventional optical lens system or it may comprise a fiber optic image dissector system for converting the image on the screen 25 to an expanded image on the screen 16.

In order to produce signals corresponding to a larger image (aperture) without exceeding the resolution capabilities of the camera tube and the bandwidth capabilities of conventional systems, a lag large interference image plate can be scanned in steps, so that the resultant image at the receiver has better definition and three-dimensional characteristics. Referring to FIG. 3, the interference pattern resulting from the reference beam and the beam reflected from the object is formed on an image storing plate 30. In this arrangement, a pair of rotatable mirrors 31 and 32 are positioned to reflect light from the plate 30 to the magnifying system 26. The mirrors are rotated by a stepping motor 33, which is synchronized by the synchronization signal generator 18. The mirrors 31 and 32 are positioned so that under control of the motor 33, they project light from different areas on the plate 30 to the magnifying system 26 in a predetermined sequence. The camera tube scans the light from each area of the plate 30 before the mirrors are stepped to project light from a different area on the magnifying system. The mirrors 31 and 32, the motor 33 and the magnifying system 26 thus comprise a step scanning microscope.

The plate 30 may comprise a conventional layer of slow decay, fine grain phosphor. In this arrangement the laser 12 may be controlled by the synchronization signal generator 18 to emit a single pulse for each complete cycle of scanning of the image on plate 30. The step scanning of the plate 30 by the step scanning microscope is preferably controlled so that the average intensity of light received from different regions of the plate 30 is equalized. Thus, if an area in one quadrant of the plate is the first one that is scanned following a laser pulse, the next area to be scanned should be in a different quadrant. As an alternative, the plate 30 may be a photochromic plate, in which event the order of scanning of the areas of the plate would not be critical. When a photochromic plate is used, the light passing through the microscope system would be derived from an additional source illuminating the plate 30, and means must be provided for erasing each image on the plate following the completion of a scanning cycle. The scanning sequence of the plate 30 is repeated in the receiver, so that the complete image is produced in the receiver.

Figure 4:
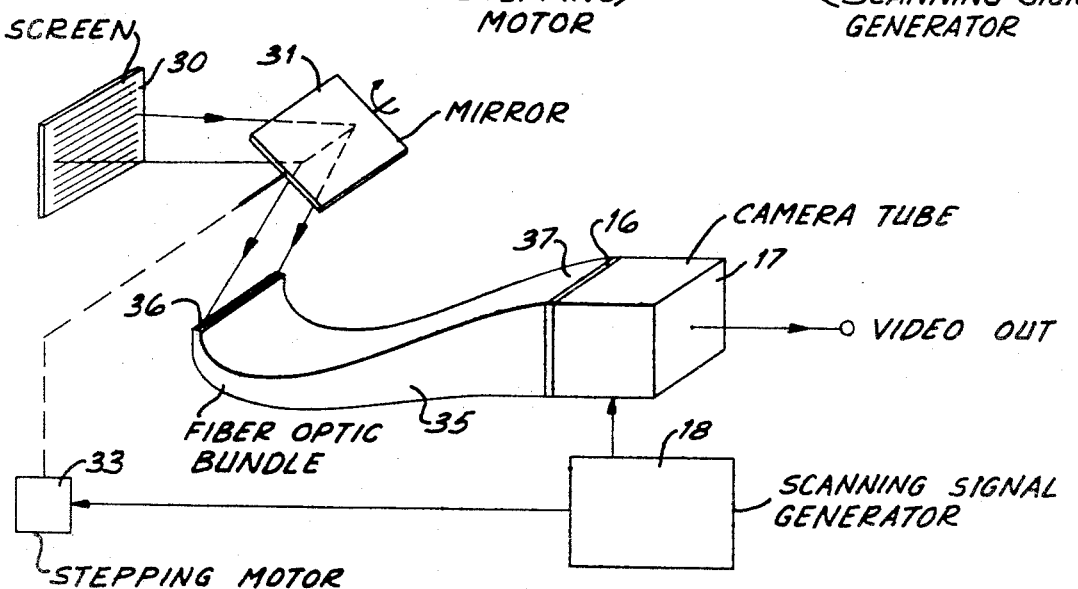
FIG. 4 is a partially perspective illustration of a modification of a portion of the arrangement of FIG. 3.

In a modification of the system of FIG. 3, as illustrated in FIG. 4, one of the rotating mirrors and the magnifying system are replaced by a fiber optic image dissector 35. The image dissector 35 comprises a bundle of individual optical fibers of a diameter of, for example, 6 microns. One of the ends 36 of the bundle is arranged with the fibers in a single row, and the other end 37 of the bundle is arranged in a rectangular form such that the row at end 36 is spread out into a scanning pattern covering the entire screen 16. For example, the row at end 36 may be expanded in the bundle to form a plurality of rows at the end 37. In this arrangement, the mirror 31 under control of the stepping motor 33 sequentially projects light from rows of the image on plate 30 onto the end 36 of the image dissector 35. The individual fibers of the image dissector transmit this light to the entire screen 16 of the camera tube. The camera tube scans the screen 16 so that the entire raster is scanned for each line of the image on plate 30, to produce a sequential signal corresponding to that line of the image. This arrangement increases the actual resolution of the final reconstructed image.

Figure 5:
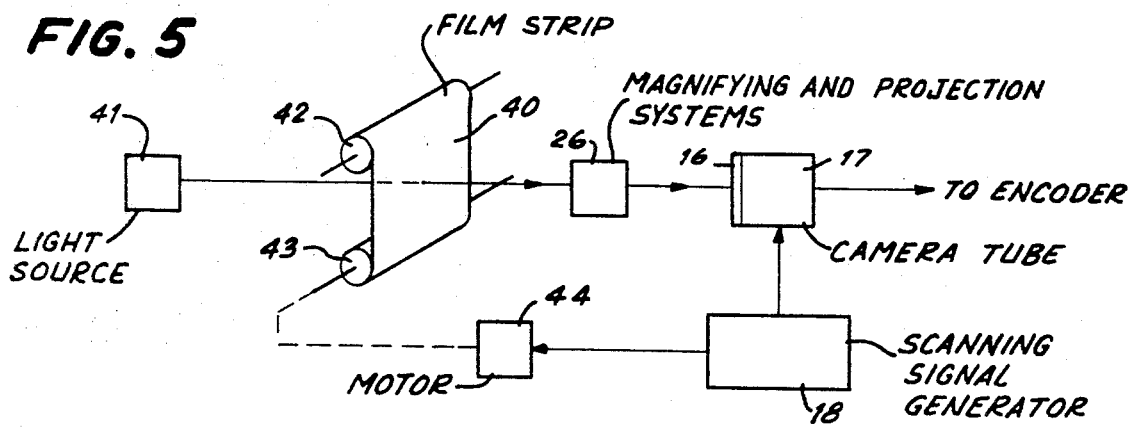
FIG. 5 is a schematic partially perspective illustration of another modification of a portion of the system of FIG. 1.

In order to produce signals corresponding to the interference pattern of a previously prepared hologram transparency, the transparency 40 (FIG. 5) is mounted between a light source 41 and the magnifying and projection system 26. If desired, a step scanning microscope system of the type shown in FIG. 3 may also be employed in the system of FIG. 5. The transparency 40 may comprise a continuous film strip of sequential hologram pictures mounted on drums 42 and 43 for being sequentially stepped into the path of the light from source 41. The motion of the film strip 40 may be produced by a motor 44 controlled by the synchronization signal generator 18.

Figure 6:
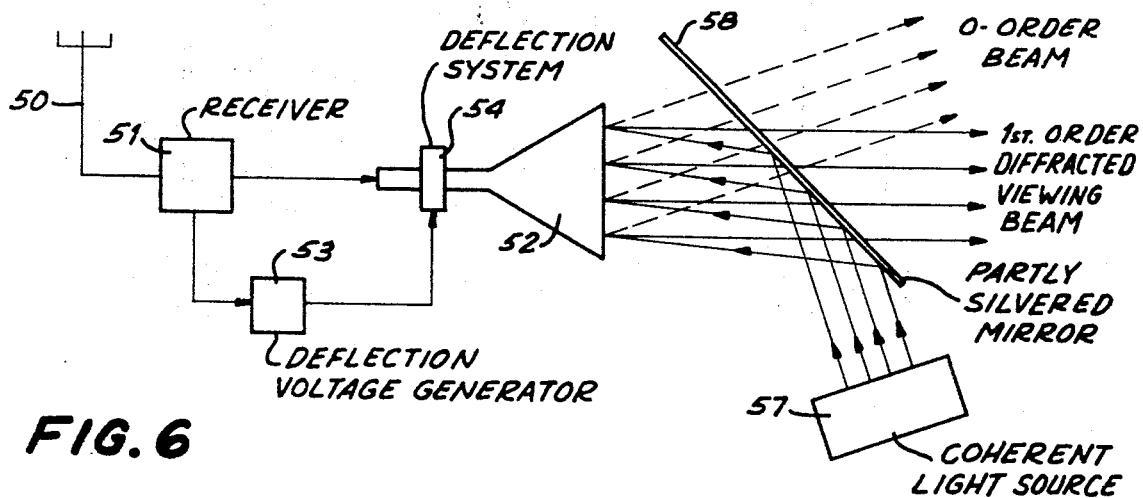
FIG. 6 is a schematic illustration of a basic system for reconstructing holographic signals according to one embodiment of my invention.

Referring now to FIG. 6, therein is illustrated a system for receiving the holographic signals and reconstructing the image according to one embodiment of my invention. Signals received by the receiving antenna 50 are applied to a television receiver 51. The receiver 51, which may be of conventional construction, converts and amplifies the received signals, and provides video and synchronization signal outputs. The video signal is applied to a control electrode of an image reproducing device 52. The synchronizing signals are applied to a deflection voltage generator 53 in order to synchronize the deflection voltages, and the deflection voltages are applied to a deflection system 54 for the image reproducing device.

Figure 7:
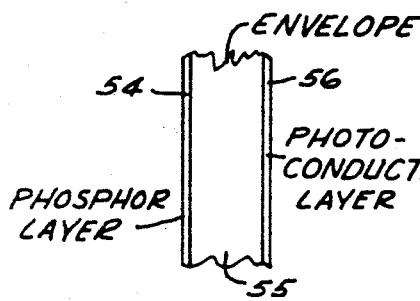
FIGS. 7, 8 and 9 are cross-sectional views of cathode ray tube screen structures that may be employed in the system of FIG. 6.

In this embodiment of my invention, the image reproducing device may comprise a cathode ray tube that is conventional with the exception of the coatings provided for the screen. As shown in FIG. 7, which illustrates a cross-sectional view of a portion of the screen of the tube 52, the screen of the tube may comprise a conventional fine grain phosphor layer 54 (e.g., P-16 ultraviolet phosphor) on the inner surface of the glass envelope 55. In addition, a thin layer 56 of a photoconductive semiconductor material is provided on the outside face of the envelope 55. The photoconductive layer has a conductivity, and hence reflectivity, that is locally modulated by light from the phosphor layer 54. It is preferred that the photoconductive material absorbs or is transparent to laser light projected thereon until it is irradiated by light of shorter wavelength from the phosphor. The photoconductive material also should have an adsorption edge wavelength $\lambda_a$ just below the wavelength of the visible laser light, so that the maximum value of the wavelength $\lambda_a$ is about 8,000 A. Suitable material for the photoconductive layer may comprise, for example, ZnS, ZnSe, ZnTe, PbO, CdSe, or CdTe. In this embodiment, if the wavelength of the radiation from the phosphor is in the ultraviolet region, the end of the envelope must be of a material, for example, quartz, which will pass such radiation.

Figure 8:
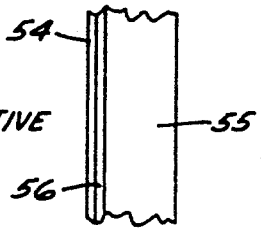
Figure 9:
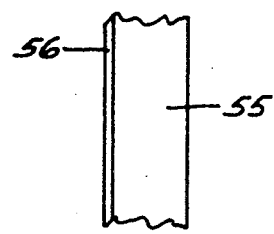

As an alternative, the photoconductive layer 56 may be provided within the envelope of the cathode ray tube between the envelope 55 and the phosphor layer 54, as shown in FIG. 8. In this construction, wherein the light of the phosphor layer also locally modulates the reflectivity of the photoconductive layer, the pattern of the modulation of the photoconductive layer is not altered by the thickness of the tube envelope, so that the image of the pattern on the photoconductive layer has a better definition. In another modification of the screen arrangement of the cathode ray tube, as shown in FIG. 9, the phosphor layer is omitted, and the electron beam of the cathode ray tube impinges directly on the photoconductive layer 56 provided in the inside surface of the face. In this arrangement, the electron beam directly modulates the reflectivity of the photoconductive layer by the release of free carriers. In this case the lifetime of the free carriers is depended upon to provide persistence of the image rather than the persistence of a phosphor, so that the photoconductive material must be selected to provide the desired persistence.

Referring again to FIG. 6, the image of the holographic pattern which has been reconstructed by local reflectivity modulation of the photoconductive layer 56, may be viewed by projecting monochromatic coherent light from a source 57 on the photoconductive layer. For example, the light from the source 57 may be directed at the photoconductive layer by means of a partly silvered mirror 58, so that the reconstructed images are visible in three-dimensional form by an observer looking through the mirror 58, toward the photoconductive layer at the correct angle. The angle of viewing is determined by the angle between the reference beam and reflected light at the transmitter, and the angle at which the light from source 57 impinges on the face of the cathode ray tube. The source 57 may comprise, for example, a laser and beam spreading means of the type provided in the transmitter, in order to produce a broad beam of coherent light. It is not necessary that the light from source 57 be collimated, since as above stated, for optical wavefront reconstruction techniques, it is not necessary that the wavefront be plane. The face of the cathode ray tube is preferably flat to simplify the optical design of the receiver and transmitter, although this expedient is not a necessity.

As in the case of reconstruction of an image from a hologram, the color of the image seen by an observer is dependent upon the color of the laser light, and a black-and-white picture in is not obtained. The wavelength of the laser light at the receiver need not be the same as that of the laser in the transmitter, however, although the size of the viewed image will depend upon the relative wavelengths of the lasers in the transmitter and receiver.

Figure 10:
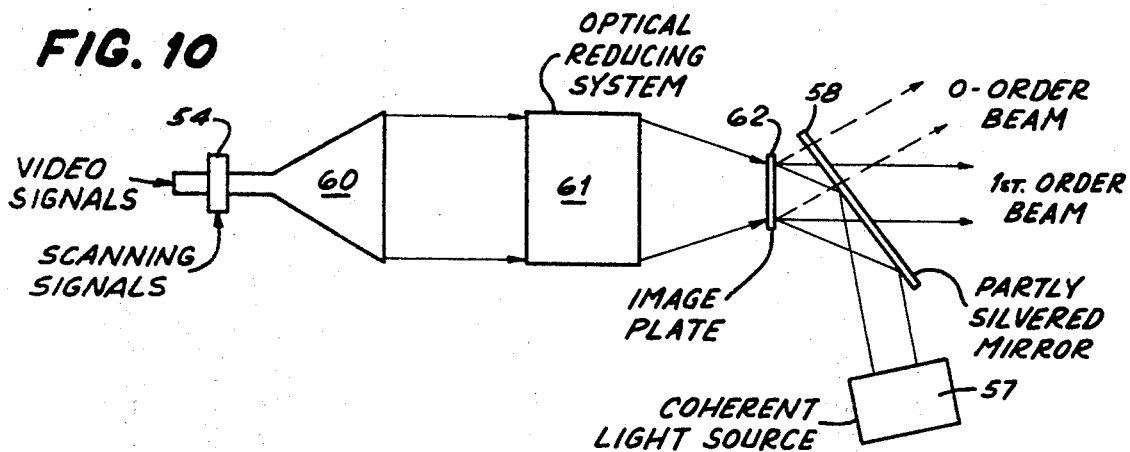
FIG. 10 is a schematic illustration of a modification of a portion of the system of FIG. 6.

In the system of FIG. 6 it was assumed that the resolution capabilities of the cathode ray tube were sufficient to provide an image of the interference pattern. In the event that the tube does not have the necessary definition, the image on the phosphor may be reduced in size before it is employed to locally modulate the photoconductive layer. For example, received signals corresponding to an expanded image of the type provided by the system of FIG. 2 may be employed to provide and an expanded image on the phosphor screen of a conventional cathode ray tube 60, as shown in FIG. 10. An optical reducing system 61 mounted in front of the face of the tube 60 is then employed to reduce the size of the image projected on the photoconductive plate 62 so that the image projected on plate 62 has substantially the same size as the picture of the original image (in the transmitter) to which the received pattern corresponds. The reducing system 61 may comprise a conventional lens system or a fiber optic image reducing system. The plate 62 is then viewed in the same manner as the photoconductive layer 56 of FIG. 6. The plate 62 may be of the same materials as the layer 56 of FIG. 6. A sequential scanning system of the type shown in FIGS. 3 or 4 may be employed in combination with the arrangement of FIG. 10 in order to produce a larger image, when signals of the type produced by the system of FIGS. 3 or 4 are received.

Figure 11:
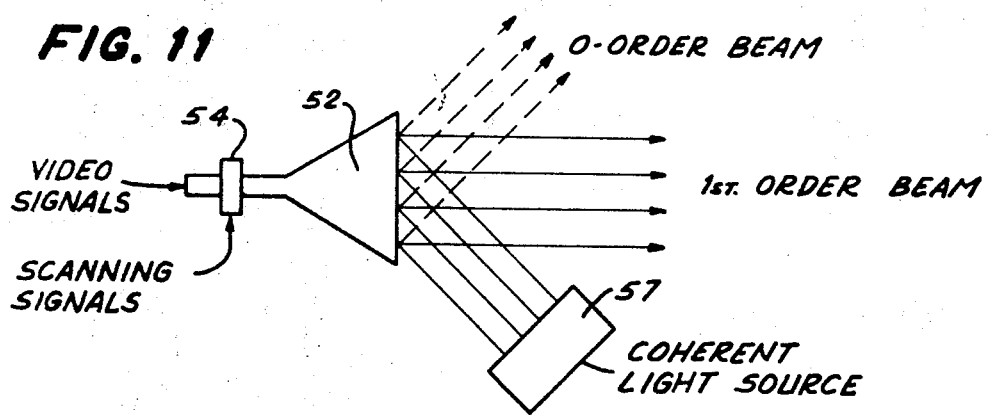
FIG. 11 is a schematic illustration of another modification of a portion of the system of FIG. 6.
Figures 12, 13, 14:
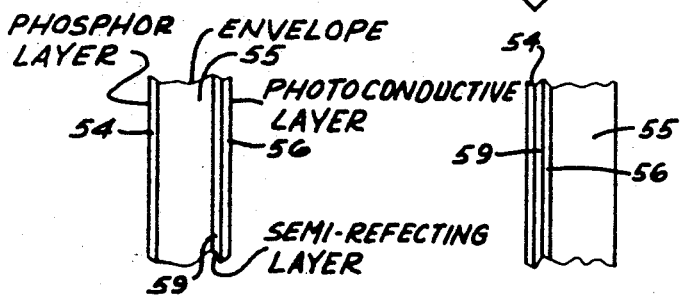
FIGS. 12, 13 and 14 are cross-sectional views of cathode ray tube structures which may be employed in the system of FIG. 11.

In modification of the system of FIG. 6, as shown in FIG. 11, the mirror 58 has been omitted and the light from source 57 is projected directly on the screen of the cathode ray tube 52. In this arrangement, the screen of the cathode ray tube is modified by providing a semireflecting coating behind the photoconductive layer. As shown in FIG. 12, the phosphor layer 54 is provided on the inside surface of the envelope, as in FIG. 7, but a semireflecting layer 59 is provided between the envelop 55 and the photoconductive layer on the outside of the envelope. Similarly, as shown in FIG. 13, the phosphor layer 54, semireflecting layer 59, and photoconductive layer 56 are provided in that order on the inside of the envelope 55. The arrangement of FIG. 14 is similar to the arrangement of FIG. 9 with the exception that an additional layer 59 of semireflecting material is provided on the inside of the photoconductive layer. In the arrangements of FIGS. 12, 13 and 14, the reflectivity image is produced on the photoconductive layer in the same manner as in the arrangements of FIGS. 7, 8 and 9, respectively, with the reflecting layer 59 being sufficiently transparent to permit the energy from the phosphor layer or the electron beam to modulate the reflectivity and transmissivity of the photoconductive layer. In the arrangement of FIG. 11, a portion of the coherent viewing light from the source 57 passes through the photoconductive layer 56 and is reflected by the semireflective coating 59 back through the photoconductive layer 56, so that the image beam (i.e., the first order diffraction beam) is produced by the transmission of the coherent light through the photoconductive layer. While there will be a slight loss of intensity of light in the image beam in this modification, no external mirror is required and the transmission characteristics of the photoconductive layer are employed to produce the viewing image. Secondary images caused by second transmissions of light are automatically eliminated by being directed to the opposite angle.

Figure 15:
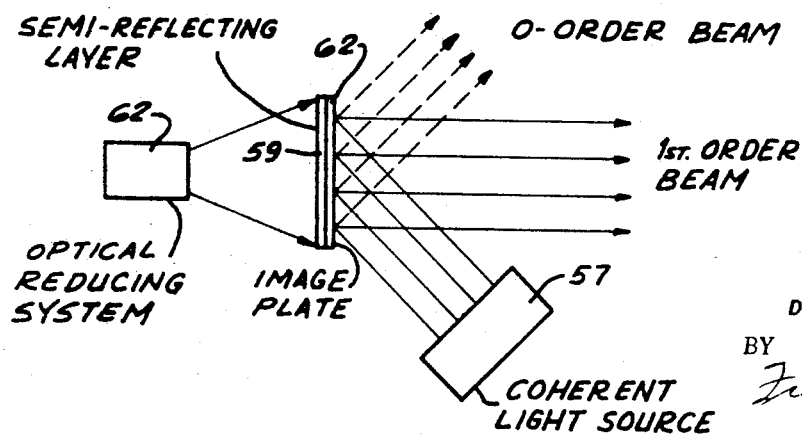
FIG. 15 is a schematic drawing of a modification of the system of FIG. 10.

Similarly, the mirror 58 in the system of FIG. 10 may be eliminated, as shown in FIG. 15, by employing a semireflecting layer 59 on the back side (i.e., toward the reducing system 61) of the plate 62.

Figure 16:
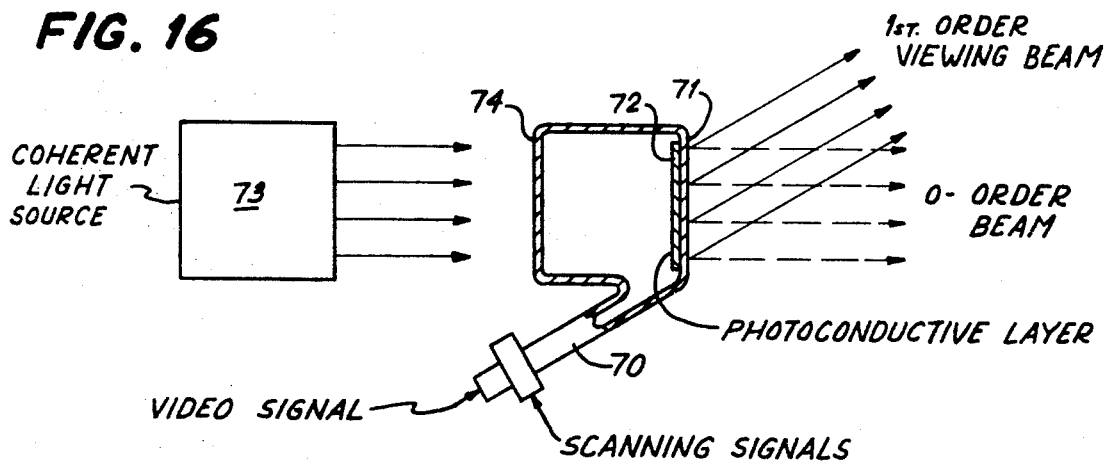
FIG. 16 is a partially cross-sectional view of a still further modification of a portion of the system of FIG. 6.

In another modification of the system of FIG. 6, as shown in FIG. 16, a cathode ray tube 70 is provided having a conventional electron gun. The electron beam is directed toward the screen 71 of the tube which has a layer 72 of photoconductive material on its inside face. The photoconductive material is of the type employed in the system of FIG. 6, and is preferably normally transparent to laser light (i.e., when it is not irradiated by the electron beam). As in the system of FIG. 6, when the screen of FIG. 9 is employed, the electron beam modulates the reflectivity and hence transmissivity of the layer 72 in accordance with the received signals. In the tube of FIG. 16, however, the broad beam source 73 of coherent light is positioned at the rear of the tube, so that the light is projected to the photoconductive layer 72 through a transparent window 74 in the back of the tube 70. The reconstructed image is thus viewed in transmission from the face of the tube without the interposition of the semireflecting mirror provided in the system of FIG. 6. The source 73 of coherent light may of course be of the same type as the source 57 of FIG. 6.

Figure 17:
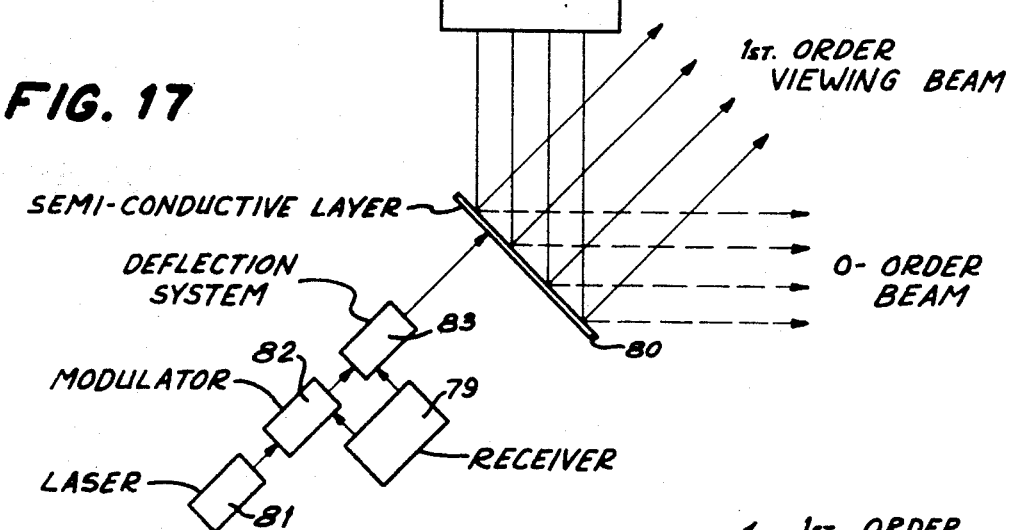
FIG. 17 is a schematic illustration of a system for reproducing holographic signals according to another embodiment of my invention.

In another embodiment of my invention, as illustrated in FIG. 17, the image is reconstructed by means of a semiconductor plate 80 without the use of an evacuated cathode ray tube. In this arrangement, intense monochromatic coherent light, preferably pulsed, from a laser 81 is intensity modulated in a modulator 82 in accordance with the amplitude of the video signal received from receiver 79. The modulator 82 may comprise a crystal of potassium dihydrogen phosphate (KDP), such as described in the article "Microwave Modulation of Light", K.K. Anderson, Microwaves, Jan. 1965, pp 42—50. The intensity modulated light from the modulator 82 is then passed through a deflection system 83 to produce a scanning beam for scanning the plate 80. The deflection system may comprise, for example, a scanning system such as described above with reference to FIGS. 3 or 4, controlled by synchronized deflection signals from the receiver 79. The modulated light beam modulates the reflectance of the semiconductor plate 80 to produce a reflectivity pattern corresponding to the transmitted interference pattern. Semiconductive materials which may be reflectivity modulated in this manner include, for example, GaAs, InSb, InAs, Ge and Si. The wavelength of the laser light should be less than the absorption edge wavelength $\lambda_g$ of the semiconductor plate.

The reflectance modulated image on the plate 80 is viewed by means of a viewing light from light source 84. The source 84, which is preferably a continuous wave laser system providing a wide beam of coherent light, is projected on the plate 80, and it is diffracted by the plate 80 in accordance with the reflectance modulation to reproduce or reconstruct the image wavefront produced by the original object. The reproduced image viewed by an observer has the same characteristics as that of the image viewed in the system of FIG. 6.

Figure 18:
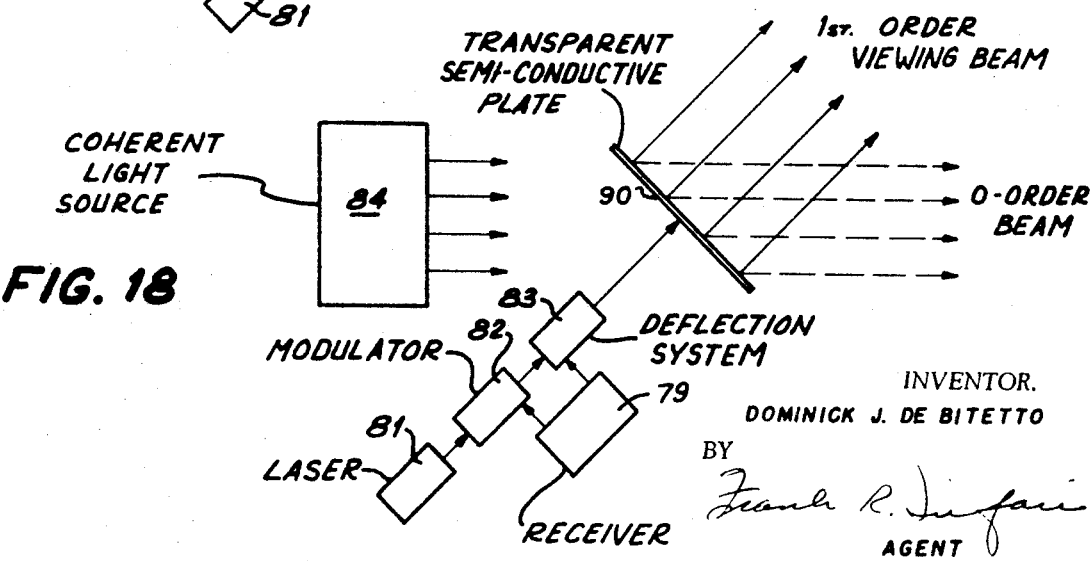
FIG. 18 is a schematic illustration of a modification of a system of FIG. 17.

In a modification of the system of FIG. 17, as seen in FIG. 18, the semiconductive plate 90 is transparent to light in the visible spectrum, and may be comprised of a material such as ZnS, ZnSe, ZnTe, PbO, CdS, CdSe or CdTe. The source 84 is positioned behind the plate 90 (with respect to an observer) so that the diffracted light transmitted through the plate (instead of the reflected light) forms the reconstructed image. The resultant viewed image is the same as that in the system of FIG. 17 due to the characteristic of holographic images that "negative" images are not produced as they are in conventional imaging techniques.

In the systems of FIGS. 17 and 18, the light from the lasers should be polarized, and the angle of incidence of light from the lasers with the semiconductor plates should be as close as possible to the Brewster's angle (i.e., angle of minimum reflectivity or maximum transmission).

While the above-described embodiments of my invention disclose the use of reproducing screens of semiconductive materials, such as photoconductive layers, it is apparent that such materials have been selected due to their characteristic of being adaptable to local modulation of their reflectance or transmittance, so that the image may be reproduced by reflecting the viewing laser light from the screen or transmitting the viewing laser light through the screen. (When the characteristic of reflectance modulation is referred to in this specification, it is considered that it is accompanied with the characteristic of transmittance modulation of the screen material, even though in some cases the other characteristics of the screen structure, such as opacity of the total screen structure, may not permit the passage of light through the structure.) It will also be apparent that other materials having the above characteristics may be employed without departing from the spirit or scope of the invention. For example, the photoconductive layer 56 on the screen of FIGS. 7, 8, 12 and 13, the image plate 62 of FIG. 10, or the semiconductor plates 80 and 90 of FIGS. 17 and 18, may be replaced by a photochromic material. Photochromic materials are a molecular dispersion of reversible light sensitive dyes suspended in a suitable medium. Such materials exhibit the characteristic of changing from a light-transmitting state to a "colored" state when exposed to light of the proper spectral distribution. Thus, photochromic materials may be employed for optical wavefront reconstruction of images either by transmittance or reflectance of the viewing laser light. Photochromic materials inherently have high resolution capabilities. An example of a substantially fatigue-free photochromic material suitable for this application is a suspension of silver halide crystals in a glass binder. The phosphors employed in the tubes of FIGS. 7, 8, 10, 12 and 13, and the light emitted from laser 81 in FIGS. 17 and 18, should of course be selected to provide the proper wavelength for stimulating the photochromic material.

The systems of my invention may also be adapted to the production of multicolor images. For example, the object may be simultaneously illuminated with coherent light sources of different wavelengths which are positioned to direct reference beams to the screen from different angles. In this case a multicolored image will be reproduced by directing viewing laser light at different angles corresponding to angles employed to produce the signals. Alternatively, since only a portion of a holographic image is necessary to reproduce an image corresponding to an entire scene, the total screen areas at the transmitter and receiver may be divided into alternate areas corresponding to the different colors, so that each area carries information relating only to a single laser light wavelength. In the latter case, simple masking techniques may be employed to insure that light of each wavelength will impinge only upon areas of the screen corresponding to that wavelength.

It will be understood, of course, that while the form of the invention herein shown and described constitutes the preferred embodiment of the invention, it is not intended herein to illustrate all of the equivalent forms or ramifications thereof. It will be obvious that modifications may be made without departing from the spirit or scope of the invention, and it is aimed in the appended claims to cover all such changes as fall within the true spirit and scope of the invention.

I claim:

1. A three-dimensional image transmission system comprising a transmitter and a receiver, said transmitter comprising means for producing a holographic image, means for slowly scanning said holographic image to produce sequential electrical signals, and means for transmitting said electric signals, said receiver comprising means for receiving said signals, first and second sources of coherent light, means for modulating the light said first source with said signals, a plate of material having variable reflectance characteristics, means for slowly scanning said modulated light across said plate, and means for directing light from said second source toward said plate whereby a three-dimensional image is reproduced by optical wavefront reconstruction.

2. The three-dimensional image transmission system of claim 1, wherein said plate is transparent and said modulated light modulates the transmissivity of said plate, whereby said image is viewed from the side of said plate opposite to the side against which light of said second source is projected.

3. The three-dimensional image transmission system of claim 1, wherein said modulated light modulates the reflectivity of said plate, whereby said image is viewed from the same side of said plate against which light from said second source is projected.

4. An image reproducing system responsive to sequential signals corresponding to a holographic image for displaying three-dimensional images, said system comprising a source of said signals, first and second sources of coherent light, means for modulating light from said first source with said signals, plate means of a material having variable reflectance characteristics, means for slowly scanning said modulated light across said plate means whereby the reflectance and transmittance of said plate means is modulated by light from said first source, and means projecting light from said second source onto said plate means whereby a three-dimensional image is reproduced by optical wavefront reconstruction.

5. The image transmission system of claim 4, wherein said material having variable reflectance characteristics is a photoconductive material.

6. The image transmission system of claim 4, wherein said material having variable reflectance characteristics is a photochromic material.

7. A system as claimed in claim 4 wherein said scanning means comprises a rotating mirror.

8. A system as claimed in claim 4 wherein said modulation means comprises a potassium dihydrogen phosphate crystal.

9. A system as claimed in claim 4 wherein said plate is selected from a member of the group consisting of GaAs, InSb, InAs, Ge, or Si.

10. A system as claimed in claim 4 wherein said plate is selected from a member of the group consisting of ZnS, ZnSe, ZnTe, PbO, CdS, CdSe, or CdTe.

11. A system as claimed in claim 4 wherein the wavelength of the light from said first laser is less than the absorbtion edge wavelength of said plate.

12. A system as claimed in claim 4 wherein the light emitted from said lasers is polarized.

13. A system as claimed in claim 4 wherein the path of the light from said lasers forms an angle with said plate substantially equal to the Brewster angle of said plate.